3,376,126
METHOD FOR REGULATING PLANT GROWTH
William C. McConnell, Atlanta, Ga., and Henry W. Rahn, Pittsburgh, Pa., assignors to Pittsburgh Plate Glass Company, Pittsburgh, Pa., a corporation of Pennsylvania
No Drawing. Continuation-in-part of application Ser. No. 358,121, Apr. 7, 1964. This application Dec. 28, 1966, Ser. No. 605,200
25 Claims. (Cl. 71—65)

ABSTRACT OF THE DISCLOSURE

According to this invention, potassium azide is utilized either alone or in combination with other chemical compounds to kill, deactivate or regulate the growth of organisms, e.g., plants, fungi, and soil micro-organisms, e.g., bacteria. Potassium azide is also used in accordance with this invention to provide plant nutrients to crop plants. Thus, in a preferred embodiment of this invention, a single application of potassium azide provides both pesticidal and fertilizing benefits to the soil.

---

This application is a continuation-in-part of application Ser. No. 358,121, filed Apr. 7, 1964, now abandoned.

Potassium azide is a crystalline solid which is readily soluble in water and is stable at all temperatures up to its melting point (350° C.) Aqueous solutions ranging from the most dilute to saturated are also very stable. Solutions containing 250 grams of potassium azide in 750 grams of water, for example, have been stored in sealed containers at room temperature for periods in excess of a year without significant decomposition.

Apparently, dissolved potassium azide ionizes into potassium and azide ($N_3$) ions. When silver, copper or lead ions, for example, are introduced into an aqueous solution of potassium azide, the corresponding azide, i.e., silver azide, copper azide or lead azide is precipitated. The precipitation is quantitative, even in very old solutions. That is, all of the azide introduced into the solution as potassium azide is precipitated out of solution in the form of, for example, silver azide.

Solutions of potassium azide have been found to possess remarkable pesticidal, e.g., herbicidal, bactericidal, nematocidal, and fungicidal properties. They are also useful as defoliants and for regulating growth of plants or plant parts. As disclosed more fully hereinafter, application of the azide to the soil, plant, or plant part often is made in forms other than aqueous solution, e.g., as dust, crystals, granules, suspensions, etc.

Because of the stable nature of potassium azide in solid form and in aqueous solution, it is surprising and unexpected that moistened solid potassium azide (or aqueous solution of potassium azide) brought into contact with soil (or other media containing micro-organisms commonly found in soil) readily decomposes into plant nutrients. Soil micro-organisms capable of decomposing potassium azide are normally present in the air. Thus, they tend to migrate from the air to surfaces, media and implements associated with agriculture such as non-soil seed beds, e.g., vermiculite, sawdust, straw, gravel, etc., harvested or growing crop plants or plant parts, and storage and shipping containers.

The time required for potassium azide to decompose when exposed to soil (or other micro-organism-bearing media) in moist condition is dependent upon many factors, e.g., the quantity of azide applied per unit area, the population density of the soil micro-organisms responsible for potassium azide's decomposition, and the temperature, moisture and chemical conditions existing in the soil (or other media). The potassium azide applied in accordance with the various embodiments of this invention decomposes substantially completely in a few days to a few weeks, rarely in excess of 30 days after application to the soil. Typically, potassium azide applied to the soil at rates between about 2 to about 500 pounds per acre decomposes completely within about 3 to about 15 days after application to the soil.

In one embodiment of this invention, potassium azide provides "pre-emergence" control of weeds. Thus, potassium azide is applied to the soil subsequent to seeding crop plants but prior to emergence of crop seedlings through the soil. In this fashion, weeds closer to the surface of the soil than are the crop plants are effectively eradicated. When the crop plant seeds are planted well beneath the surface of the earth, i.e., in excess of 1 to 2 inches, single application rates of potassium azide as high as 25, rarely above 100, pounds per acre are useful. Typically, when the crop seeds are planted less than an inch beneath the surface of the earth, the recommended single application rate of potassium azide is less than 25 pounds per acre, e.g., about 2 to about 20 pounds per acre. It is possible to use lower or higher rates of application and to rely upon a plurality of applications. In any event, the amount of potassium azide applied should be sufficient to inhibit growth of weeds without having an adverse effect on crop growth.

According to a further embodiment of this invention, potassium azide is applied to the soil prior to the planting of crops. Sufficient time is allowed to elapse for the azide to decompose to below dangerous levels before the crop is seeded. Relatively low doses of potassium azide, i.e., about 2 to about 20 pounds per acre are usually sufficient to inhibit effectively the growth of annual weed seeds. Crops can usually be planted within a short period, e.g., about 1 to about 5, rarely more than 10 days after application of these relatively low dosages of potassium azide. When it is desired to kill well-established annuals, or perennials or to effectively clean up an area of aboveground plants and seds as well as underground seeds and roots, tubers and other reproductive parts of both annual and perennial plants, higher application rates, e.g., about 25 to about 500 pounds per acre are used. These high rates are also effective in killing woody plants, shrubs, and vines as well as fungi, nematodes, soil insects and micro-organisms. High application rates of potassium azide are particularly useful in reclaiming patches of agricultural land which have succumbed to weeds and/or other pests. Well-established roots penetrating two to four feet or more into the ground are killed in this fashion. Rates in excess of 500 pounds per acre are within contemplation although seldom desirable because of economic considerations.

It is sometimes advantageous to apply potassium azide "post-emergence" to the crop plants. In this fashion, some families of weeds are selectively killed without significant damage to crop plants. Thus, it has been discovered that broad-leaf plants are more susceptible to the herbicidal activity of potassium azide than are narrow-leaf plants. Accordingly, potassium azide may be applied to the crop plants to kill weeds, notably annual weeds, which are not as well-established as the crop plants. In midsummer, for example, well-established crop plants often tolerate doses of potassium azide of 200 pounds per acre or more. Significantly lower rates of potassium azide, e.g., about 2 to about 100 pounds per acre are effective in killing weeds which have emerged significantly long after emergence of the crop plant. Thus weeds which have emerged subsequent to a cultivation or herbicidal treatment of a plot of crop plants and have not yet developed well-established root systems are effectively and selectively killed out of a field of crop plants by application of dosages of potassium azide well below the amount tolerable to the crop plant. Where crop plants mature significantly more slowly than the weeds which infest the area in which they grow, potassium azide is most advantageously applied relatively soon after the weeds' emergence through the soil.

According to a further embodiment of this invention, potassium azide is utilized as a plant growth regulator. Thus, potassium azide dust, spray or solution is applied to the appropriate plant part to kill, stunt or retard growth of buds, flowers, runners, e.g., tobacco suckers, or fruit of growing plants. This treatment is effective in thinning fruits such as, for example, apples, peaches, pears, plums, cherries, berries, or citrus fruits. It is also effective in preventing seed formation, notably of weeds and in altering plant growth, notably in developing ornamental plants. A noteworthy application of this embodiment is the application of potassium azide solution to sugar cane to prevent tasseling thereby enhancing the sugar content of the cane stocks. The potassium azide is preferably applied in the form of dilute aqueous solution, i.e., about 1 to about 20 percent by weight basis the solution potassium azide in water. If it is desired merely to inhibit development of the treated plant part rather than destroy the part entirely, solutions containing about 1 to about 5 percent by weight potassium azide are usually preferred.

According to a further specific embodiment of this invention, a dilute, i.e., about 1 to about 20 percent by weight solution or similarly dilute dust, i.e., a dust containing 1 to 20 percent by weight potassium azide, is applied to a crop prior to harvest. The crop is in this fashion defoliated so that the harvested crop is free from undesirable foliage. Application rates in the practice of this embodiment are typically about 2 to about 20 pounds per acre, although higher rates are sometimes useful. According to this embodiment, the aerial portions of cotton plants, for example, are sprayed when the bolls are mature to cause leaves to die and fall off the plant. When the bolls are subsequently harvested with a mechanical picker, the incidence of green stains on the bolls normally caused by leaves is significantly reduced, often essentially eliminated. Similarly, seed recovery from alfalfa seed crops is enhanced by defoliation of the alfalfa plants prior to threshing. Substantially higher rates of potassium azide, i.e., up to about 500 pounds per acre, are often applied to a field when it is desired that the potassium azide either provide other herbicidal effects or provide plant nutrients to the field in addition to defoliating the crop plants therein.

Seed protection and delayed germination of seeds are accomplished by applying potassium azide, usually in the form of a dust, dip or spray directly to the seed. The azide kills fungi which normally prevent proper germination and growth of the seed and/or seedling. The potassium azide subsequently decomposes to harmless plant food, i.e., potassium and nitrogen-containing compounds, which stimulate growth of the seedling. Sufficient azide is applied to the seeds to kill the undesirable fungi; however, care is taken that the azide dosage is below the level tolerated by the seed. It is often desirable to add sufficient azide to the seed to retard germination until well after the fungi are killed. In the practice of this embodiment, dust, dip, or spray usually contains about 20 parts per million to about 1000 parts per million of potassium azide depending upon the azide tolerance of the seed and other conditions, e.g., temperature, moisture, and chemistry of the soil in which the seed is to be planted. Usually, the application of the azide is done by briefly contacting the seed with the azide-containing medium, the ultimate dosage consisting of the azide present in the medium which clings to the seed.

Frequently pesticides decompose into products which are detrimental to plant life, particularly crop plants. An outstanding characteristic of potassium azide is its property, unlike other water soluble azides, e.g., sodium azide, of converting from extremely active pesticide to products which are not only harmless to but significantly beneficial to plant life. As potassium azide remains in contact with the soil, it is decomposed by microbial and chemical agents in the soil to form potassium and nitrogen-containing products. These products are available as plant food and do not possess the biological toxicity of potassium azide. Thus in a preferred embodiment of this invention, potassium azide is applied to the soil to cleanse the soil of undesirable organisms. Seeds are then planted. The seeds are planted prior to re-establishment of the undesirable organisms in the soil, but subsequent to the decomposition of potassium azide into plant food.

The time interval allowed to elapse after application of potassium azide but prior to planting depends on the amount of potassium azide applied, soil type, moisture, temperature and other conditions of the soil. A single application of potassium azide not only clears the planting area of undesirable plant life, seeds, fungi, nematodes, etc., but serves as an excellent fertilizer for newly planted seeds. It is usually safe to plant most crop seeds or seedlings about 1 week to 1 month after application of up to 500 pounds per acre or more of potassium azide. At lower application rates, for example, about 20 to about 100 pounds per acre, planting can be done even sooner, for example, about 3 to about 10 days.

Potassium azide is very soluble in water. Thirty-one percent potassium azide by weight, basis the solution, may be dissolved in water at 10° C. At 40° C. solutions containing up to 50 percent by weight potassium azide, basis the solution, are conveniently prepared. Potassium azide solutions may be stored and used in vessels of mild steel, stainless steel, and or nickel, for example, for time periods normally required in agricultural practice without significant reaction between the azide solution and the material of the container. Thus in all of the embodiments described herein potassium azide is often conveniently applied, as spray or dip to seeds, plants or soil in aqueous solution. Other methods of application are within the scope of this invention. Potassium azide may also be applied to soil, packages, or directly to plants in the form of, e.g., crystals, granules, or finely comminuted dry dust. It is sometimes convenient to mix solid potassium azide with a wettable powder of water insoluble pesticide, e.g., 2,4-dichlorophenoxyacetic acid. The mixture, containing from less than 1 to in excess of 90 percent by weight azide is then conveniently mixed in aqueous media prior to application.

In aqueous solution, it is often convenient to dissolve along with the potassium azide other water-soluble pesticides or fertilizers. It is customary practice to apply sprays to crops in the form of aqueous solutions or dispersions. Thus, pesticides in organic solution or dispersion are conveniently mixed with aqueous solutions of azide to form an emulsion or suspension. The mixture is then sprayed, sometimes while being agitated to prevent the aqueous and inorganic phases from separating. Alternatively, the aqueous solution of potassium azide, with or without other active ingredients in solution is sprayed either before or after other pesticides or fertilizers are applied. Powdered or crystalline potassium azide in combination with wettable powders of other pesticides is preferably mixed in aqueous media immediately before spraying. Upon agitation, the potassium azide dissolves in the aqueous media while the water insoluble powders are suspended therein. Usually, sufficient aqueous medium, typically tap water, is employed that the solution contains less than 25, normally about 1 to about 10 percent by weight potassium azide.

When it is desired to dust crop plants with dry dust, the potassium azide may be ground to very fine powder size, usually minus 100 mesh. It is usually desirable to dilute the azide with inert solid diluent such as silica, clay, talc, bentonite, diatomaceous earth, woodflour, etc. Good distribution of the azide is usually facilitated by diluting the azide with up to in excess of 99 percent inert dust. Sometimes formulations containing about 5 to about 25, rarely in excess of 30 percent azide are useful. Another effective method of diluting potassium azide for solid application is to supply the potassium azide as an absorbed ingredient or coating on granules of inert material, for example, attapulgite clay, corn cob, sawdust, bentonite, etc. The azide may also be absorbed or coated on other pesticides, pesticide-containing granules, or fertilizers, especially natural fertilizers such as manures, activated sludge, etc. Potassium azide is usually present in these granules, etc., in amounts of less than about 25 percent by weight, basis the granule including all absorbed constituents, although much greater proportions are possible and within contemplation. The potassium azide content of these granular products typically ranges from about 1 percent to about 20 percent, most often about 2 percent to about 10 percent.

When the azide is applied to the soil in crystal, granular or other solid forms, it is sometimes allowed to lie on the soil, exposed to normal weather conditions. It is more often watered into the soil. It is frequently harrowed or plowed into the earth. In general, potassium azide may, because of its very flexible properties, be applied to the soil by any known technique commonly used in the application of presently available fertilizers and/or pesticides.

The following examples illustrate the manner in which the invention may be practiced:

EXAMPLE I

Duplicate paper pots were filled with soil taken from a well mixed stock. The pots were seeded with a variety of plants. Immediately after seeding, the soil in the pots was treated with a variety of herbicides. Each of the herbicides was applied in 5 percent acetone and 95 percent water mixture, basis the weight of the mixture. Fifteen milliliters of mixture was applied to each pot. All pots were exposed to identical artificial light and overhead irrigation. The plants were observed for 10 days and an injury rating was given in comparison with untreated controls. Table 1 records the herbicidal materials, application rates, and plants used in this experiment as well as the results obtained.

EXAMPLE II

Greenhouse flats of sandy loam soil were seeded with cotton, corn, soybean, milo, and a mixture of annual weed seeds (crabgrass, goosegrass, and pigweed). Nutsedge tubers, Johnson grass, and Bermuda grass rhizomes were buried 2½ to 3 inches deep in the soil. Immediately after planting, potassium azide granules were worked into the top ¼ inch of soil at rates of 25, 50, 100, 300 and 500 pounds per acre. The flats were then watered overhead with approximately ½ inch of water. Each flat was subsequently sprinkled as needed to maintain moisture in the soil. The flats were observed and evaluated as to the degree of injury according to the following scale:

| | |
|---|---|
| No injury | 0 |
| Minor injury | 10–30 |
| Moderate injury | 30–60 |
| Severe injury | 60–90 |
| Complete kill | 100 |

The degree of injury to the various plants, approximately 6 weeks after application of potassium azide is recorded in Table 2.

TABLE 2

| | Degree of Injury | | | | | | | |
|---|---|---|---|---|---|---|---|---|
| | Bermuda Grass | Johnson Grass | Nutsedge | Mixture of Annual Weeds | Cotton | Soybeans | Corn | Milo |
| Potassium Azide, Lbs./Acre: | | | | | | | | |
| 25 | 74 | 45 | 63 | 33 | 58 | 63 | 46 | 18 |
| 50 | 81 | 82 | 98 | 60 | 74 | 82 | 58 | 42 |
| 300 | 99 | 96 | 97 | 95 | 99 | 100 | 95 | 60 |
| 100 | 96 | 69 | 99 | 79 | 85 | 95 | 65 | 30 |
| 500 | 100 | 83 | 99 | 98 | 100 | 100 | 100 | 99 |

EXAMPLE III

Two test areas of 2 square feet each were staked off in a vacant lot. The lot was heavily infested with perennial and annual broadleaved and grassy weeds. Perennial roots extended more than 18 inches below the surface of the soil. Most of the top growth was removed from the test areas by clipping the weeds about 8 inches above the soil surface. The plots were treated by sprinkling ½ gallon of aqueous solution of potassium azide uniformly over each test area. One test plot was treated at a rate of 100 pounds of azide per acre. The other was treated with 500 pounds of azide per acre. Three weeks later, the 100 pound $KN_3$ per acre plot showed no change; all plant life was dead on the plot treated with 500 pounds $KN_3$ per acre. A ten inch high tomato plant was transplanted into the center of the 500 pound $KN_3$ area. Seeds of corn, lima beans, lettuce and turnips were planted in rows in the same area. Two weeks after planting (5 weeks after application of $KN_3$) the tomato plant had grown substantially and was blooming. All of the seeded species were growing well. The plants all exhibited the typical dark green color associated with nitrogen fertilization.

EXAMPLE IV

Following the procedure of Example III, three test plots of 2 square feet each were treated with 0, 200, and 400 pounds per acre rates of potassium azide. The test

TABLE I

| Active Material | Application Rate, Pounds Per Acre | Mustard | Pigweed | Crabgrass | Foxtail | Corn | Wheat | Cotton | Beans |
|---|---|---|---|---|---|---|---|---|---|
| $KN_3$ | 4 | 3RG | 3RG | 1RG | 1RG | 3RG | 0 | 2S | 3S |
| $KN_3$ | 8 | 5RG | 5RG | 4RG | 5RG | 4S 2RG | 3RG 2S | 5RG | 5RG |
| Atrazine | 4 | 2S 2C | 2S 2C | 2C 1S | 2C 1S | 0 | 0 | 0 | 2C |
| 2,4-D | 4 | 5RG | 5RG | 5RG | 5RG | 2RG 3SC 3S | 3S 1SC 3RG | 5RG | 5RG |
| Acetone Water Control | | 0 | 0 | 0 | 0 | 0 | 0 | 0 | 0 |
| Untreated | | 0 | 0 | 0 | 0 | 0 | 0 | 0 | 0 |

Degree of Injury: 0—none; 1—slight; 2—moderate; 3—moderately severe; 4—severe; 5—death.
Type of Injury: RG—reduced germination; SC—stem curling; S—stunting; C—chlorsis.

plots were in well-cultivated, unfertilized, poor garden soil. The plots were kept moist by watering as needed. Three weeks after treatment, each of the test areas was seeded with corn, lima beans, squash, and spinach. Two weeks later the seedlings in the test areas treated with potassium azide were growing much more vigorously than in the control area. As growth progressed, it was apparent that plants of the same type were growing fastest in the 400 pounds $KN_3$ plot and slowest in the control plot. The plants in the 400 pound $KN_3$ area were of darker green color than those in the 200 pound $KN_3$ area. The plants in the 200 pound $KN_3$ area were of darker green color than the control plants. Subsequent tissue annalyses confirmed that the plants from the 400 pound $KN_3$ plot contained more nitrogen and more potassium per gram of tissue than the plants from the 200 pound $KN_3$ plot. The plants from the 200 pound $KN_3$ plot contained more of these elements per gram of tissue than the control plants.

EXAMPLE V

An assortment of weed seeds including pigweed, barnyard grass, kochia and crabgrass were placed in approximately equal amounts in 6 inch petri dishes each of which contained two pieces of filter paper saturated with 10 cc. of 20 parts per million by weight aqueous solution as indicated in Table 3. The petri dishes were kept in the dark at 80 to 85° F. Each dish had its own glass cover. The table contains data relating to the growth of the seeds in each of the dishes at five-day intervals.

TABLE 3

| Dish | Aqueous Solution | 5 Days After Treatment | 10 Days After Treatment | 15 Days After Treatment |
| --- | --- | --- | --- | --- |
| 1 | Water | Fair growth | Seedlings wilted due to drying. 10 cc. water added to each dish. | Fair growth resumed. |
| 2 | Isopropyl N-phenyl-carbamate. | Some stunting | do | Stunted growth. |
| 3 | Isopropyl N-(3-chlorophenyl) carbamate. | Marked stunting | do | Do. |
| 4 | Sodium azide | No growth | do | Fair growth resumed. |
| 5 | Potassium azide | do | do | Vigorous growth. |

Although the instand invention has been described with particular reference to certain specific embodiments and examples, it is not intended thereby to limit the scope of this invention except insofar as specific limitations are recited in the appended claims.

We claim:
1. The method of killing weeds which comprises applying a herbicidal amount of potassium azide to the soil in the vicinity of the weeds.
2. The method of inhibiting the growth of weeds in soil in which crop plants are grown which comprises applying a herbicidal amount of potassium azide to the soil.
3. The method of claim 2 wherein the potassium azide is applied to the soil prior to planting crop plants therein.
4. The method of claim 2 wherein up to 100 pounds per acre of potassium azide is applied to the soil subsequent to seeding crop plants therein but pre-emergence the crop plants.
5. The method of claim 4 wherein up to 25 pounds per acre of potassium azide is applied to the soil.
6. The method of claim 5 wherein about 2 to about 20 pounds per acre of potassium azide is applied to the soil.
7. The method of claim 2 wherein up to 200 pounds per acre of potassium azide is applied to the soil post-emergence crop plants therein.
8. The method of claim 7 wherein about 2 to about 100 pounds per acre of potassium azide is applied to the soil.
9. The method of claim 8 wherein the weeds are broad-leaf weeds and the amount of azide applied is less than the amount required to kill said crop plants.
10. The method of defoliating plants which comprises applying a defoliating amount of potassium azide to the foilage of the plant.
11. The method of claim 10 wherein about 2 to about 20 pounds per acre potassium azide is applied.
12. The method of claim 11 wherein the azide is applied as an aqueous solution.
13. The method of claim 11 wherein the potassium azide is applied as a dust in admixture with an inert material.
14. The method of inhibiting growth of plant parts which comprises applying an effective amount of potassium azide to said plant parts.
15. The method of claim 14 wherein an aqueous solution of potassium azide is applied to the buds of the plant.
16. The method of claim 14 wherein an aqueous solution of potassium azide is applied to the flowers of the plant.
17. The method of claim 14 wherein an aqueous solution of potassium azide is applied to the runners of the plant.
18. The method of claim 14 wherein an aqueous solution of potassium azide is applied to the fruit of the plant.
19. The method of claim 15 wherein the azide solution is applied to the runners of tobacco plants.
20. The method of delaying germination seeds which comprises applying to said seeds an effective amount of potassium azide.
21. The method of claim 20 wherein the potassium azide is applied in a formulation containing about 20 to about 1,000 parts per million by weight azide in admixture with an inert medium.
22. A method of killing weeds in an area wherein crop plants have emerged from the soil which comprises applying to the soil in the area sufficient potassium azide to kill the weeds, said amount of azide being less than the amount required to kill said crop plants.
23. The method wherein an amount of potassium azide is applied to the vicinity of an established crop plant, said vicinity including weeds which have emerged after the emergence of the crop plant, sufficient to inhibit the growth of the weeds but less than the amount which will significantly damage the crop plant.
24. The method of claim 23 wherein the weeds are annual weeds.
25. The method of claim 24 wherein the weeds are broad-leaf weeds.

References Cited

UNITED STATES PATENTS 1,819,399  8/1931  Wessenberg _____ 167—14

FOREIGN PATENTS 898,915  6/1962  Great Britain.

OTHER REFERENCES

Danielson, Weeds, vol. 13, #2, pp. 96–98, (1965) 71-2.2.

Hill et al., Chem. Weed Control in Tobacco Plant Beds, 1953, pp. 3, 9, 16–18, 20, 22, 24, 33, 35 and 42.

Lundegardh, Chem. Abst., vol. 57, col. 3870(i), 1962.

Lyr, Chem. Abst., vol. 57, col. 3870(i), 1963.

Ray, Chem. Abst., vol. 58, col. 1724(d) 1963.

Chemical Abst., vol. 54, col. 15335(c) and 18686 (1950).

JAMES O. THOMAS, JR., *Primary Examiner.*